Oct. 30, 1962
R. W. MEYER
3,061,496
METHOD OF FORMING COLOR-PATTERNED GLASS FIBER PANELS
Filed Nov. 20, 1956
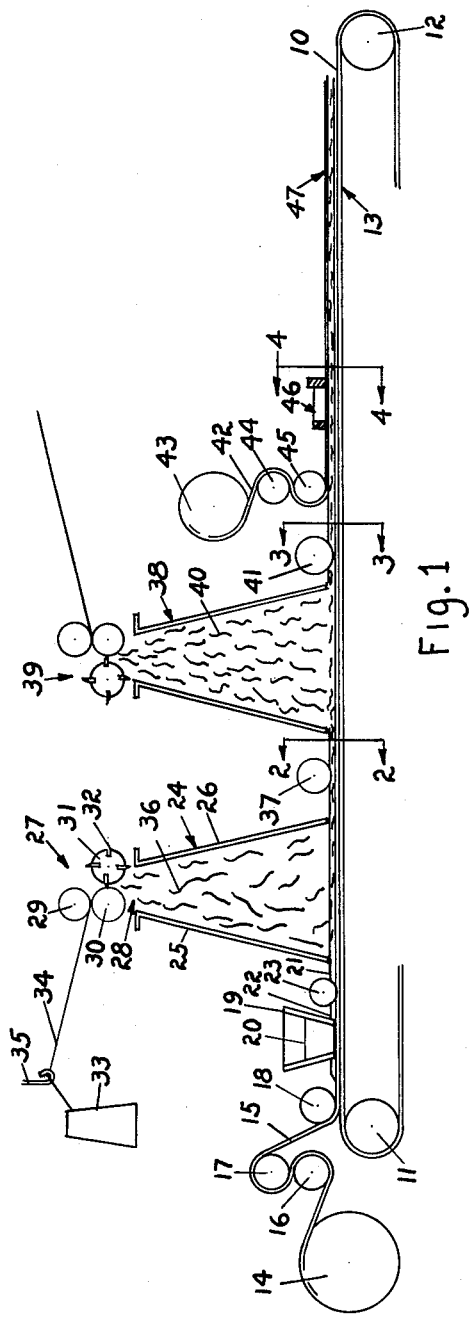
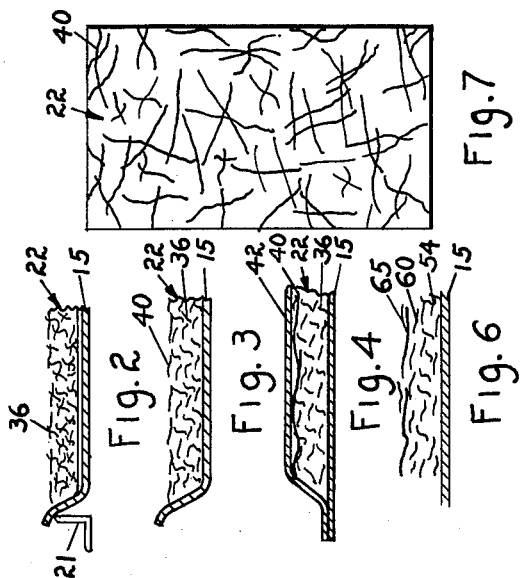
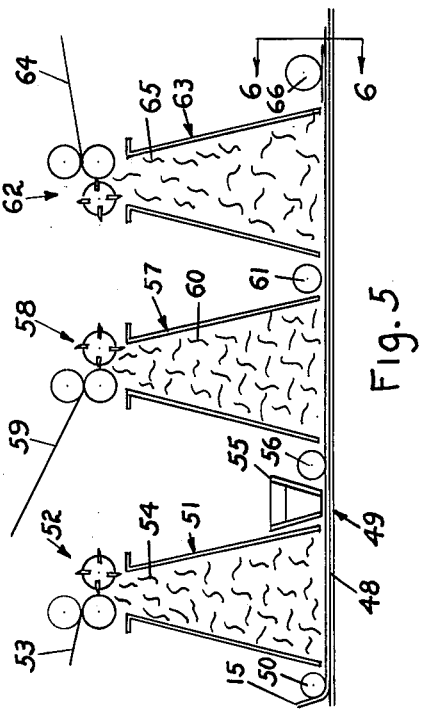
INVENTOR.
Raymond W. Meyer
BY
Nobbe & Swope
ATTORNEYS United States Patent Office 3,061,496
Patented Oct. 30, 1962

3,061,496
METHOD OF FORMING COLOR-PATTERNED
GLASS FIBER PANELS
Raymond W. Meyer, Bellaire, Tex., assignor, by mesne assignments, to Johns-Manville Fiber Glass Inc., Cleveland, Ohio, a corporation of Delaware
Filed Nov. 20, 1956, Ser. No. 623,490
3 Claims. (Cl. 156—26)

This invention relates generally to synthetic resin articles of manufacture and more particularly to thermosetting synthetic resin panels having novel decorative surfaces and to processes for their production.

In one aspect, the invention relates to a process for the production of reinforced thermosetting synthetic resin panels having novel decorative surfaces, wherein the decorative effects are provided by incorporating distinctly colored materials into said surfaces.

In another aspect, the invention relates to a process for the production of reinforced thermosetting synthetic resin panels having decorative surfaces, wherein distinctively colored reinforcing fibers are incorporated into said surfaces to lend strength as well as color thereto.

Reinforced thermosetting synthetic resin panels containing a predominate amount of synthetic resin as the base or body material and various kinds of reinforcing agents such as chopped glass fibers, woven glass cloth and the like have gained rapid acceptance in recent years for the production of many commercial items. Such items include awnings, building closures and others wherein weather proofness, light transmission and decorativeness are all advantageously utilized in a single material. Also, such materials have gained rapid and wide acceptance for interior decorating uses, such as for colorful partitions between offices in industrial buildings, for screens between rooms in homes, and the like. These products heretofore have generally been comprised of a transparent resin, such as a polyester resin, containing a light resistant dye and/or pigment to impart a uniform and translucent color to the product. The reinforcing agents employed have generally included clear glass fibers, which have an index of refraction approximately equivalent to the index of refraction of the synthetic resin when the panels are cured to a hard, solid state. Thus, the fibers contributed substantially no aesthetic appeal to the products.

In accordance with the present invention, in the art of both interior and exterior decoration, a step forward is obtained by providing multiple color combinations in such synethetic resin panels.

It is therefore an important object of the present invention to provide a thermosetting synthetic resin product having novel decorative effects and a process for producing such a panel.

Another object of the invention is to provide thermosetting synthetic resin panels having colored materials incorporated into one or more of the surfaces thereof to lend color distinctness thereto.

A further object of the invention is to provide thermosetting synthetic resin panels having colored reinforcing fibers incorporated into the panel adjacent one or more surfaces thereof to lend strength as well as color distinctness to the panels.

A still further object of the invention is to provide thermosetting synthetic resin panels having colored glass fibers incorporated therein and an improved process for forming such panels.

Other objects and advantages of the invention will become more apparent during the course of the following description when taken in connection with the accompanying drawings.

In the drawings, wherein like numerals are employed to designate like parts throughout the same:

FIG. 1 is a schematic side view of an apparatus for producing multiple-color synthetic resin panels;

FIG. 2 is a section view taken along the line 2—2 of FIG. 1;

FIG. 3 is a section view taken along the line 3—3 of FIG. 1;

FIG. 4 is a section view taken along the line 4—4 of of FIG. 1;

FIG. 5 is a schematic side view of apparatus in accordance with a second embodiment of the invention whereby either novel decorative effects can be imparted to both surfaces of a synthetic resin panel or a two-toned effect can be imparted to one surface of such panel;

FIG. 6 is a section view taken along the line 6—6 of FIG. 5; and

FIG. 7 is a plan view of a synthetic resin panel made according to the method and apparatus of FIG. 1 showing randomly dispersed chopped reinforcing strands of distinctive color imbedded in the surface of the panel.

As shown by the apparatus displayed in FIG. 1, a continuous belt 10 is movably mounted upon rolls 11 and 12 whereby the upper forward flight 13 thereof is moved in a horizontal plane. Power means, not shown, such as an electric motor is operably connected to one of the rolls 11 or 12 through a suitable reduction drive system for moving the belt 10 at a uniform speed. A roll 14 of thin plastic material such as regenerated cellulose (known in the trade as cellophane) is suitably mounted for rotary movement to pay out the film 15 to be fed into the entrance end of the apparatus. Film 15 is passed underneath and partially around a first feed roll 16, thence around and over a second feed roll 17 and downwardly beneath a lay down roll 18 whereby the film is carefully and smoothly positioned upon the forward flight 13 of continuous belt 10. Rolls 16 and 17 are vertically disposed relative to one another and function to maintain the film under desired tension.

A hopper 19 positioned forwardly of the aforedescribed rolls is adapted to contain a thermosetting synthetic resin 20 in liquid form. Hopper 19 is provided with outlet apertures (not shown) whereby the liquid resin 20 is metered onto the top surface of the film 15, previously laid down upon flight 13. Along each side of the forward flight 13 of belt 10 there is positioned a suitable retainer member, such as a small section angle iron designated 21 whereby each edge of the plastic film 15 is slightly elevated to provide a shallow trough to retain the liquid resin 20 as a layer 22, in the manner shown in FIG. 2. A gauge roll 23 is positioned forwardly of hopper 19 to spread and level the previously metered liquid resin 20 into the layer 22 of uniform thickness extending across the width of the film 15.

At 24 there is illustrated a chopped fiber dispersing hood comprising an upstanding box of pyramidal section including front and rear walls 25 and 26 of rectangular configuration, and end walls, not shown, of trapezoid configuration to thereby form a chopping and dispersing chamber which diverges from the top downwardly. A fiber chopping mechanism 27 is disposed immediately above the top opening 28 of hood 24. The chopper 27 includes upper and lower feed rolls 29 and 30 and a cutter carrying roll 31 having cutter knives 32 axially disposed to project peripherally from roll 31 to contactingly engage the periphery of roll 30. Reinforcing material is supplied from a package 33 of glass fibers in the form of strands or roving, from which the roving 34 is led by means of a guide 35 between feed rolls 29 and 30 and thence around and down between roll 30 and cutter roll 31. Cutter roll 31 is rotated at a peripheral speed synchronized to that of feed rolls 29 and 30 and thus the knives 32 cut the glass roving 34 into short sections which drop into the upper end of hood 24 for dispersal upon the layer of resin 22, previously laid down by the hopper 19 and gauge roll 23 upon the palstic film 15 supported by the forward flight 13 of continuous belt 10. The chopped fibers 36, dispersed upon the resin layer 22 by means of the hood 24 and chopper unit 27, are approximately of the same index of refraction as the resin layer 22 so that they become nearly invisible in the resin upon curing. A press roll 37 is positioned forwardly of the hood 24 to press the chopped fibers 36 into the resin layer 22.

At 38 there is shown a chopping hood, similar to the chopping hood 24 and having a chopper unit 39 mounted thereabove whereby chopped colored reinforcing fibers designated by reference numeral 40 are deposited upon the upper surface of the resin layer 22. A roll 41 positioned adjacent the exit end of chopping hood 38 is employed to press the colored fibers 40 into the upper surface of the resin layer 22 in a uniform manner.

A top plastic film 42 is next positioned upon the layer of synthetic resin 22 having both reinforcement and decorative fibers incorporated therein. A roll of plastic film 43, such as cellophane, is rotatably mounted upon suitable supports (not shown) above and in alignment with belt 10. The film 42 is payed out from roll 43, over and around a first feed roll 44, between said first feed roll and then half-lapping a lower feed roll 45 which lays the film 42 down upon the synthetic resin layer 22. At 46 there is schematically shown a squeegee device for smoothing out and stretching the upper film 42, and for pressing bubbles of air from beneath the plastic film to prevent voids in the resin layer 22 as well depressing the fibers 40 into the surface of the resin layer 22.

At the exit end of the forward flight 13 of continuous belt 10, the wet resin lay up 47 is cut into appropriate sizes for subsequent placement between either flat or corrugated molds as desired. The assembled molds and lay up 47 are then forwarded to a curing oven (not shown) wherein, under the influence of heat, the liquid resin is set to a hard solid state.

FIG. 2 illustrates a cross section of the wet resin lay up 47 as it emerges from the first fiber dispersing hood 24 where due to the action of roll 37 the chopped fibers 36 have been pressed into and commingled with the resin body in a uniform manner.

In FIG. 3, the resin layer 22 has the chopped reinforcement fiber 36 commingled therewith, and the vividly colored decorative chopped fibers 40 floating on the surface of the resin layer.

FIG. 4 shows a section view of the wet resin lay up 47 with the top plastic film 42 applied thereto and ready to be passed to the cutting and curing operation.

FIG. 5 shows another embodiment of an apparatus adapted to the production of synthetic resin panels having brightly colored chopped fibers incorporated in each of their surfaces. Reference numeral 48 designates the forward flight of a continuous belt 49, similar to that shown in FIG. 1. The plastic film lay down roll is designated by numeral 50 and immediately beyond such roll is positioned a first fiber chopping hood 51 with a chopping unit 52 positioned thereabove. Chopping unit 52 is adapted for chopping vividly colored strand 53 into short the plastic film 15, previously positioned upon the forward flight 48 of the continuous belt 49. Next following the chopping hood 51 there is positioned a resin hopper 55 and gauge roll 56 combination for depositing a uniform layer of liquid resin upon the brightly colored layer of lengths 54 for deposition as a thin dispersed layer upon chopped fibers previously positioned upon the plastic film 15. A reinforcement fiber chopping hood 57 with a chopper unit 58 positioned thereabove occupies the next station along the assembly line. Clear glass fibers 59 are chopped into short lengths 60 by means of chopper unit 58 and are dropped as a uniformly dispersed mat upon the synthetic resin layer. A press roll 61 is positioned at the exit end or side of the hood 57 for pressing and submerging the chopped reinforcing fibers 60 into commingled relationship with the liquid synthetic resin. A second decorative fiber chopping unit 62 and dispersing hood 63 are positioned next in line of the apparatus. By means of hood 63 and its cutter unit 62 positioned thereabove, brightly colored strands 64 are chopped into short lengths 65 for deposition as a thin dispersed layer upon the top surface of the layer of synthetic resin. This layer is shown in FIG. 6. At the exit side of the dispersing hood 63 is positioned a press roll 66, similar to the press roll 41 shown in FIG. 1, whereby the top layer of chopped colored fibers 65 is pressed into the upper surface of the resin layer. A top cover film is then applied in the manner described in FIG. 1 and the cutting and curing operations are conducted in the manner previously described.

Resins applicable to use in the present invention include polyesters, such as those made by the interaction of a polybasic acid or an anhydride of such acid with a polyhydric alcohol. Any desired combination of polybasic acid or anhydride and polyhydric alcohol may be used. For example, unsaturated dibasic acids such as maleic, fumaric, itaconic, citraconic, mesaconic and the like are applicable. Also the saturated dibasic acids such as succinic, adipic, sebacic and the like, and the aromatic acids such as phthalic acid and phthalic anhydride are applicable. The dihydric alcohols include polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (either in the alpha or beta position), such as monoformen or monoacetin, any monoether of glycerol with a monohydric alcohol such as monoethylin, or any dihydroxy alkane in which the alcohol radicals are primary or secondary or both, in the series from dihydroxy butane to dihydroxy decane.

A product obtained by the hardening of a composition in which an unsaturated polyester is the only polymerizable component is generally lacking in water resistance and hardness. By addition of a liquid monomeric polymerizable compound to the unsaturated polyester and then copolymerizing the two materials, a product is produced which has improved water resistance and improved hardness. Accordingly, it is desirable in the process of the present invention to add a monomeric material such as styrene or the like. Such monomeric material serves a dual purpose. In addition to providing a more water resistant finished product, it serves to lower the viscosity of the liquid resin 20 in hopper 19 and thus facilitates flowing the resin down upon the film 15, FIG. 1. Also since the styrene is copolymerized with the polyester and becomes an integral part of the finished product, the solvent removal problem is substantially eliminated.

It is contemplated that a variety of reinforcement materials are applicable to use in the structure and production of panels and synthetic resin articles made in accordance with this invention. These materials may include fibrous substances such as inorganic and organic origin, including glass fibers, cotton fiber and others and threads or strands composed of materials such as rayon, nylon, jute, hemp and the like. Also, woven cloth material, chopped into small patterned bits may be employed. Glass fibers in the form of multiple fiber strands have been preferred because of their high strength to weight ratio and their compatibility with the liquid thermosetting synthetic resins. These fibers can be dyed over a wide range of colors to provide some very brilliant and striking color combinations which lend color harmony and a distinct decorative appeal to the products of the invention.

Reinforcement materials applicable to use include preferably clear glass fibers in random mat form as has been described in the foregoing description. However, other fibrous materials may be used such as for example fibers of synthetic and natural origin including the synthetic resin materials such as nylon, rayon, Dacron and the like and the naturally occurring vegetable materials such as cotton, jute and the like. It is preferred to use these materials when formed into continuous strands or threads for convenience in chopping and depositing them as a random mat onto the liquid resin layer. As mentioned, clear glass fibers are preferred because their index of refraction is substantially the same as the index of refraction of the clear thermosetting resins, such as the polyester resins, when such resins are cured to a hard, solid state. Thus when it is desired to incorporate light fast dyes and/or pigments into the resin to impart a background tint thereto and thus to the body of the panel or synthetic resin article, there will be no conflict with the color tone being sought. When employing reinforcement materials which are not inherently clear, such as is the case with glass fibers, it will be desirable in order to preserve color harmony in the finished product to select materials which are colored in a manner to blend with the color of the surface decorative material to be discussed below. As mentioned, clear glass fibers are preferred due to their high strength weight ratio to thus provide very light weight, but very strong products. However, when employing glass fibers, it is to be considered within the scope of the invention to color them in a manner that they may blend with the dye and/or pigment employed, to lend color to the body of the resin and harmonize with the decorative materials incorporated into the surfaces of the products in contrasting or two-tone manner.

In some instances, it may be desired to employ filling agents such as clay, titanium dioxide, iron oxide or other known inorganic filling and/or coloring agents with the liquid resin, in finely powdered form, where products of low strength can be tolerated, and wherein a broad range of color combinations may be desired.

The materials employed to impart color effects to the surfaces of the products of the present invention are preferably glass fibers in the form of strands, yarns, or rovings, which have been colored with resin compatible dyes and/or pigments to impart vivid and distinctive colors thereto. These materials are preferred because their high strength and resin compatibility imparts decorativeness as well as strength to the finished products. These materials may be arranged upon and in the surfaces of both panel and other products in a variety of configurations ranging from thinly dispersed random mats of chopped strands of short length to more heavily arranged layers of longer chopped section which curl and interlace with one another. Additionally these fibers of the same or varying colors may be used in combination. Also the fibers may be arranged in parallel manner and continuous length configurations upon the surface of the resin layer to provide a striped effect in the finished panel products. Also transverse strands may be combined with the longitudinally extending strands to provide plaid effects in the product surfaces. In some instances it may be desired to incorporate materials other than the glass fibers described into the surfaces of the products to impart color thereto. Such materials may include pattern cut bits of paper or cloth or films of colored synthetic resins or the like which may or may not impart added strength to the finished product. These materials are colored vividly in the manner described for the glass fibers and thereby a variety of patterns and color combinations harmonizing either with the background color of the main body of the panel or of the background color imparted to a clear resin by means of a colored reinforcement material may be provided. When using such materials, it is preferable that they are completely coated with the resin so as to become an integral part of the product when the resin is cured.

Products of the present invention are cured in a conventional manner, which includes either the use of a catalyst or heat or a combination of both as will be desired. Applicants have preferred to employ a resin mixture which includes a catalyst such as benzoyl peroxide or other in a small amount to thereby accelerate the rate of curing when the products are subjected to a heating operation. As mentioned hereinbefore, panel products cut to size after the wet lay up assembly operation, may be placed between upper and lower metallic molds of suitable surface configuration. Thus flat molds can be employed to provide flat panels; corrugated molds can be employed to provide corrugated panels, and shaped objects such as door knobs, control wheels, control handles, chair seats and other molded products can be pressed where the shape of such products will allow the deposition of a surface coloring agent after the main body of the article has been fabricated and while the resin is still in liquid state to surround and wet the surface decorative material.

Cover films applicable to use in the production of panel products include regenerated cellulose, cellulose acetate and the like, which are preferred because of their low cost. Of course other materials such as polyvinyl chloride and others may be employed if desired.

It is to be understood that the form of the invention herewith shown and described is to be taken as a preferred embodiment of the same, but that various changes may be resorted to without departing from the spirit of the invention or the scope of the subjoined claims.

I claim:

1. A process for making decorative fibrous reinforced synthetic resin articles, comprising forming a body of liquid synthetic resin having a particular index of refraction and a particular color, intermixing with said body of liquid resin a plurality of reinforcing fibers having an index of refraction approximately the same as that of said resin, dispersing upon said body of liquid resin a plurality of relatively short strand lengths of glass fibers having a color contrasting with the color of the liquid synthetic resin, said strand lengths being dispersed so as to permit relatively large areas of resin to be visible therebetween, impressing said strand lengths of fiber into the surface of said body of resin, and curing said resin to a hard solid state.

2. A process for making fibrous reinforced synthetic resin panels, comprising forming a layer of pigmented liquid thermosetting synthetic resin having a predetermined index of refraction and a predetermined color, admixing into said resin layer chopped glass fibers having an index of refraction approximately the same as that of said resin layer, dispersing upon said resin layer a plurality of strand lengths of glass fibers of a contrasting color relative to the color of said resin, impressing said strand lengths of glass fibers of contrasting color into a surface of said resin layer while maintaining a relatively smooth resinous surface, said strand lengths of contrasting color being ultimately positioned adjacent the resinous surface so as to be sharply distinguished therefrom, said strand lengths also being dispersed in a manner so as to present relatively large resinous areas between said strand lengths, and curing said resin to a hard solid state.

3. A process for making decorative fibrous reinforced resin panels, comprising distributing a plurality of strand lengths of glass fibers having a predetermined color onto a thin carrier sheet, said fibers being dispersed so as to leave relatively large void areas between said strand lengths, depositing on said colored fibers a liquid layer of heat curable pigmented synthetic resin having a predetermined index of refraction and a color contrasting with the color of said glass fibers, said liquid layer covering said fibers and filling in the voids between the fibers, working into the layer of resin a plurality of individual lengths of reinforcing glass fibers having an index of refraction approximately the same as that of said resin, dispersing upon said layer of resin a plurality of strand lengths of glass fibers having a color contrasting with the color of said resin, impressing said latter lengths of fibers into the surface of said layer, but maintaining said latter colored fibers adjacent the surface, said latter colored glass fibers being dispersed so as to present to view relatively large resinous surface areas between the latter colored fibers, and heat curing the resin into a hard solid state.

References Cited in the file of this patent

UNITED STATES PATENTS

| | | |
|---|---|---|
| 2,343,600 | Weimann | Mar. 7, 1944 |
| 2,593,818 | Waggoner | Apr. 22, 1952 |
| 2,620,853 | Boese | Dec. 9, 1952 |
| 2,647,297 | Battista | Aug. 4, 1953 |
| 2,688,580 | Fingerhut | Sept. 7, 1954 |
| 2,728,699 | Labino | Dec. 27, 1955 |
| 2,784,763 | Shorts | Mar. 12, 1957 |
| 2,830,925 | Fennebresque et al. | Apr. 15, 1958 |
| 2,837,457 | Baxter | June 3, 1958 |
| 2,905,580 | Kreier | Sept. 22, 1959 |

FOREIGN PATENTS

| | | |
|---|---|---|
| 760,530 | Great Britain | Oct. 31, 1956 |

UNITED STATES PATENT OFFICE
CERTIFICATE OF CORRECTION

Patent No. 3,061,496　　　　　　　　　　October 30, 1962

Raymond W. Meyer

It is hereby certified that error appears in the above numbered patent requiring correction and that the said Letters Patent should read as corrected below.

Column 3, line 64, after "short" insert -- lengths 54 for deposition as a thin dispersed layer upon --; line 71, strike out "lengths 54 for deposition as a thin dispersed layer upon --.

Signed and sealed this 26th day of March 1963.

(SEAL)
Attest:

ESTON G. JOHNSON　　　　　　　　　　DAVID L. LADD
Attesting Officer　　　　　　　　　　Commissioner of Patents